United States Patent [19]

Hutchins

[11] Patent Number: 4,762,309
[45] Date of Patent: Aug. 9, 1988

[54] HYDRAULIC MOUNT HAVING A FLEXIBLE DECOUPLER WITH AN ORIFICE THERETHROUGH

[75] Inventor: Bruce E. Hutchins, Milford, Mich.
[73] Assignee: Saturn Corporation, Troy, Mich.
[21] Appl. No.: 96,638
[22] Filed: Sep. 14, 1987
[51] Int. Cl.⁴ ............... F16M 5/00; B60G 15/04; F16K 21/04; B62D 21/00
[52] U.S. Cl. .............. 267/140.1; 137/513.5; 137/517; 137/859; 180/312; 248/562; 248/636; 267/219
[58] Field of Search ............ 267/35, 113, 140.1, 267/219, 256, 257; 188/266, 298; 180/312; 248/562, 636, 638; 137/851, 859, 513.5, 517

[56] References Cited

U.S. PATENT DOCUMENTS 4,611,795  9/1986  Muzechuk .................... 267/140.1
4,694,651  9/1987  Yardley et al. ............ 137/513.5 X
4,700,931  10/1987 Eberhard et al. ................. 267/35

FOREIGN PATENT DOCUMENTS 3638647  5/1987  Fed. Rep. of Germany ...... 180/312

Primary Examiner—Andres Kashnikow
Assistant Examiner—Robert J. Oberleitner
Attorney, Agent, or Firm—R. L. Phillips

[57] ABSTRACT

A hydraulic mount has a flexible decoupler with an opening therethrough and grooves intersecting therewith providing a controlled fluid connection between liquid filled chambers to control the damping. Fluid flow between the chambers is restricted as the flexible decoupler contacts one of two sandwiching valve portions, formed as part of a partition member, and further fluid flow is allowed only through the decoupler grooves.

3 Claims, 2 Drawing Sheets

4,762,309

HYDRAULIC MOUNT HAVING A FLEXIBLE DECOUPLER WITH AN ORIFICE THERETHROUGH

TECHNICAL FIELD

This invention relates to hydraulic mounts and more particularly to those with a decoupler that controls the damping therein.

BACKGROUND OF THE INVENTION

As is well known, the main advantage of a hydraulic mount is that damping can be obtained in warm weather as well as cold weather which is not possible with high damped rubber compounds such as butyl. In such hydraulic mounts, the damping is obtained by an elongated orifice which delays fluid transfer between two liquid filled chambers and wherein the peak damping frequency is determined by the length and diameter of the orifice. It is also known that the hydraulic damping can be controlled by the addition of a decoupler which allows for small mount displacements without significant liquid transfer through the orifice and thus without significant damping. This is desirable in isolating road induced vibrations from the vehicle body by providing for the engine to then operate as a dynamic damper to absorb these vibrations.

Previous decoupler designs generally relied on a direct sized opening through the decoupler which reduces the maximum damping available and causes the mount to have two damping ranges, i.e. a very low one below a certain small mount displacement and a very high one above this displacement. Typically, these prior decouplers consist of a solid, hard plastic diaphragm with leakage provided around the periphery or a flexible rubber diaphragm with either leakage around the periphery, or through a sized hole in the center of the diaphragm which seats against an opening in the partition supporting the decoupler so that there is still flow through the decoupler at large mount displacement to reduce the maximum damping. While these prior designs have proven generally satisfactory, further gains in vehicle ride are possible if the damping transition could be smoothened or feathered along with better control of the minimum and maximum damping.

SUMMARY OF THE INVENTION

The present invention provides precise control of the damping values while adding feathered transition all in a cost-effective manner with a simple flexible decoupler having a central opening therethrough to directly connect the chambers and grooves in both sides of the decoupler for also communicating the chambers with this opening. The flexible decoupler allows fluid to pass through the opening up to a given mount displacement but above this displacement the decoupler flexes sufficiently to alternately contact with sandwiching valve portions provided on the partition supporting the decoupler to close the opening to then provide maximum damping. Feathered transition is provided by the grooves added to both sides of the decoupler. These grooves provide limited communication through the chambers to the decoupler opening when the same is otherwise closed by the valves. The flow passage formed by the grooves is substantially smaller than the decoupler opening and decreases in size to eventually zero with increasing displacement above a predetermined relative displacement by the decoupler squeezing against the valves to flatten these grooves.

It is thus an object of the present invention to provide a new and improved hydraulic mount.

Another object is to provide in a hydraulic mount a flexible decoupler that together with the partition supporting same is operable to control communication between the chambers in the mount such that flow therethrough in parallel with the normal orifice is gradually blocked with increasing mount displacement above a predetermined value.

Another object is to provide in a hydraulic mount a flexible decoupler that is peripherally sealed and has an opening therethrough which in cooperation with valves sandwiching same and grooves in the side of the decoupler operate to provide controlled communication between the chambers so as to establish precise damping values above and below a certain displacement with a feathered or smooth transition therebetween.

These and other objects, advantages and features of the present invention will become more apparent from the following description and drawing in which.

Figure 1:
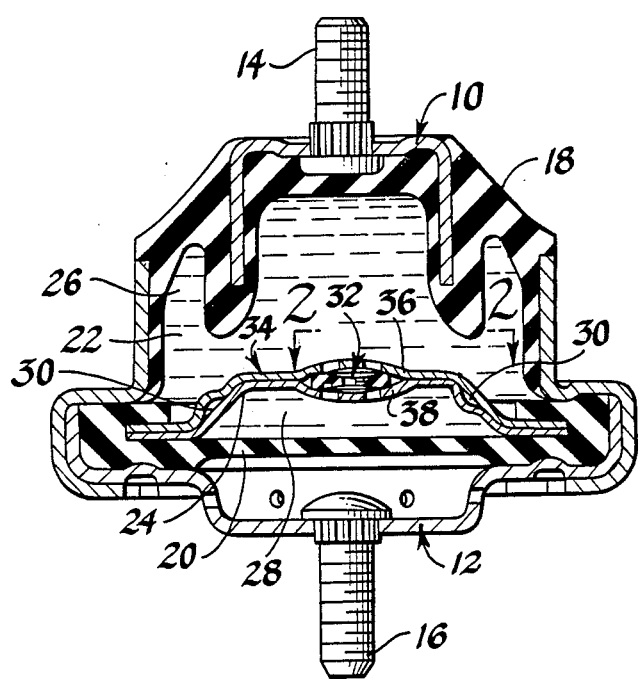
FIG. 1 is a sectional view of a hydraulic mount constructed according to the present invention.

Referring to FIGS. 1-4, the hydraulic mount thereshown is adapted for mounting an internal combustion engine in a road vehicle. The mount generally comprises a pair of mounting members 10 and 12 having aligned outwardly projecting studs 14 and 16 respectively by which the engine mount is connected to the engine and vehicle frame or engine cradle. An elastomeric body 18 connects the mounting members 10 and 12 and an elastomeric diaphragm 20 cooperates with the elastomeric body to define a closed cavity 22 filled with a liquid such as an anti-freeze solution. A two-piece partition 24 divides the cavity into two chambers 26 and 28 and an elongated orifice 30 formed between the two pieces of the partition and extending thereabout just inward of the diaphragm rim connects the chambers. The hydraulic engine mount thus far described except for the two-piece partition and the formation of the orifice therebetween is like that disclosed in U.S. Pat. No. 4,661,795, assigned to the assignee of this invention and which is hereby incorporated by reference and to which reference may be made for further understanding of the various details of this type of mount apart from the present invention and the description that follows.

Figure 6:
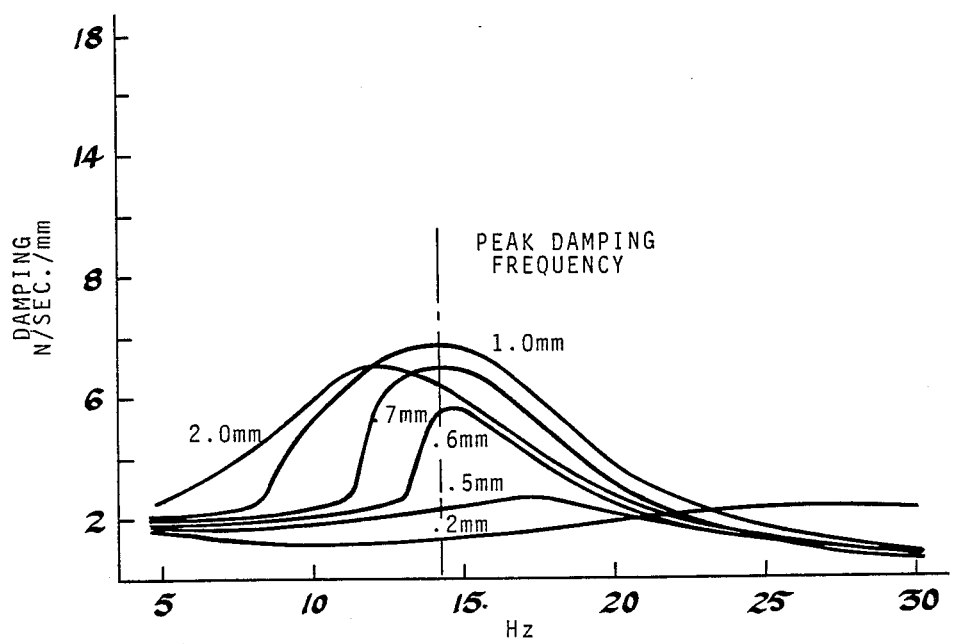
FIG. 6 is a plot of damping versus frequency of the hydraulic mount in FIGS. 1-4 at the same mount displacements in FIG. 5.

In such a mount, the long orifice 30 connecting the two chambers delays the fluid transfer between the chambers to provide damping. And as is well known, the length and diameter of the orifice determine the peak damping frequency as can be seen in FIG. 6 is slightly below 15 Hz for the tested mount.

Figure 2:
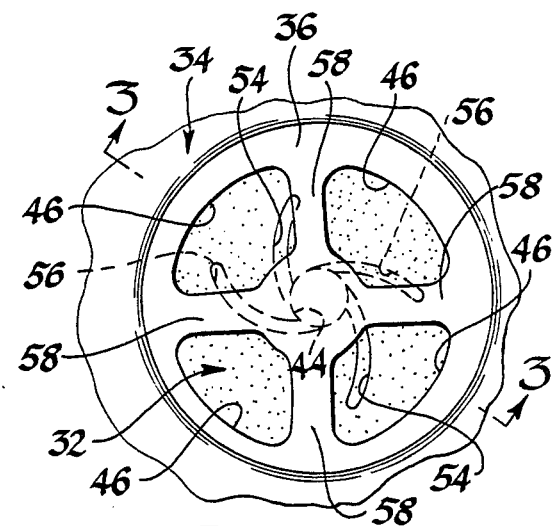
FIG. 2 is a partial view taken along the line 2—2 in FIG. 1.
Figure 3:
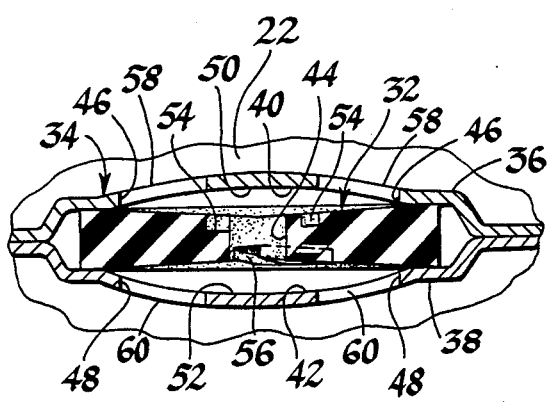
FIG. 3 is an enlarged sectional view taken along the line 3—3 in FIG. 2.

According to the present invention, a flexible decoupler 32 in the form of a round rubber diaphragm is mounted in a cage 34 formed centrally in the partition parts by two outwardly projecting perforated sides 36 and 38 respectively as best seen in FIGS. 2 and 3. The periphery of the decoupler 32 is clamped between the cage sides 36 and 38 so as to be sealingly secured thereto while the central portion of the decoupler is spaced inwardly from the concaved interior surfaces 40 and 42 of the cage members as seen in FIG. 3. A central opening 44 in the decoupler 32 together with the perforations 46 and 48 through the opposite cage sides provides a short direct passage between the chambers 26 and 28 through the decoupler (partition) in parallel with the orifice 30.

Figure 4:
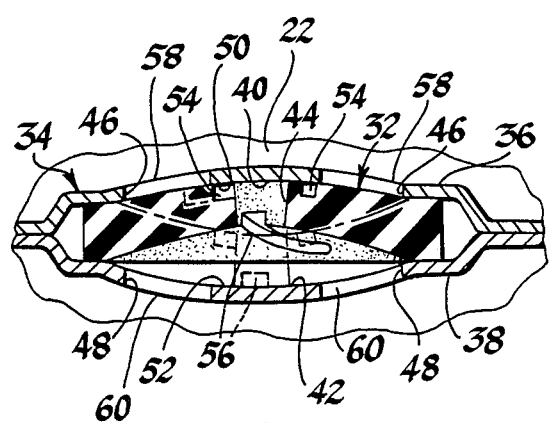
FIG. 4 is a view similar to FIG. 3 but showing the decoupler displaced upward (solid line) and downward (phantom-line).
Figure 5:
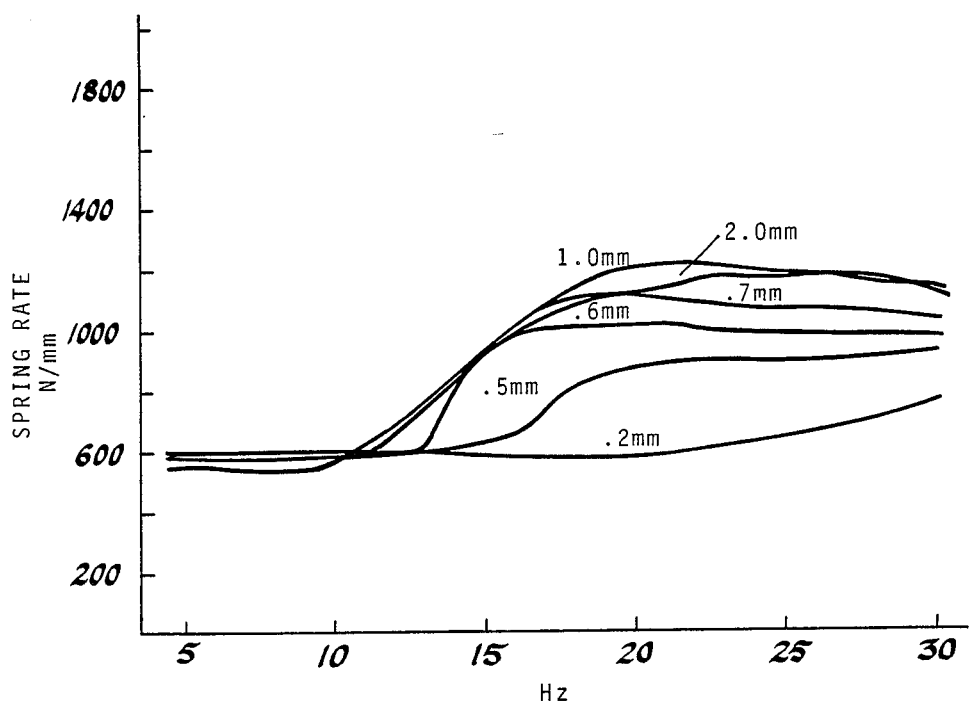
FIG. 5 is a plot of spring rate versus frequency of the hydraulic mount in FIGS. 1-4 at various mount displacements as noted.

The size of the opening 44 and the flex characteristics of the decoupler are determined so as to allow displacement of the fluid between the chambers without damping (without forced flow through orifice 30) by the decoupler not flexing at its center sufficiently to close off its opening at small mount displacement, e.g. 0.2 mm and 0.5 mm as shown in FIG. 5. Without this decoupling, the spring rate for 0.2 mm and 0.5 mm would be much higher than that shown in FIG. 5 and possible produce objectionable ride. Above a given displacement, e.g. 0.5 mm, the decoupler is calibrated so as to alternately seat against the concave surfaces 40 and 42 as shown in FIG. 4 whereupon the central opening 44 apart from the grooves is then closed (covered) by centrally located circular concave valve face portions 50 and 52 of these respectively. When the decoupler opening is closed by the sandwiching valves 50 and 52 there is then provided increased damping as effected by forced flow through the orifice 30 and as seen for example occurring at 0.6, 0.7, 1.0 and 2.0 mm displacements in FIG. 6 and with correspondingly increased spring rate as seen in Figures at these same displacements.

Feathered transition between the low damping and high damping is provided by the addition of two radial grooves 54 and 56 in the respective sides of the decoupler. The grooves 54 and 56 intersect with the decoupler opening and extend radially outward past the respective valves 50 and 52 so as to always be open through the cage openings 46 and 48 to the respective chambers 26 and 28. However, the total fluid passage that the grooves form past the valve faces is substantially smaller than the decoupler opening so that the flow allowed thereby is substantially reduced or limited as compared with when the decoupler opening is uncovered. Thus when the decoupler flexes and contacts the cage and the valves 50 and 52 cover the opening 44, fluid may still pass from the chambers through these radial grooves to the decoupler opening and on to the other chamber. Moreover, as the mount displacement increases to a certain value (e.g. 0.7 mm and higher) the grooves are proportionately flattened by the valve faces further reducing the flow until they finally close at a certain large displacement (e.g. 1.0 mm) whereupon even the limited flow through the decoupler is then completely shut off by the flattened closed grooves.

As best seen in FIG. 2, the radial grooves are curved or spiral so as to allow random rotation positioning of the decoupler in the cage without blocking the grooves against the radial segments 58 and 60 joining the respective valve portions 50 and 52 to the peripheral portion of the cage sides 36 and 38. Furthermore, it will be understood that while two such grooves have been shown on each side, more or less grooves and of other configuration may be provided to effect the limited transitional connection between the chambers and the decoupler opening as the decoupler closes on the valves.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. A hydraulic mount comprising a pair of mounting members, an elastomeric body connecting said members, an elastomeric diaphragm cooperating with said body to define a closed cavity filled with a liquid, a partition dividing said cavity into two chambers, an elongated orifice connecting said chambers, a flexible decoupler sealingly mounted along the periphery thereof in an opening through said partition, said decoupler having an opening therethrough for connecting said chambers, a pair of valves on said partition sandwiching said decoupler and alternately contacted thereby to cover said decoupler opening on alternating deflection of said decoupler above a predetermined relative displacement of said mounting members, and at least one groove in both sides of said decoupler intersecting with said decoupler opening for providing limited communication between said chambers through said decoupler opening when same is otherwise alternately closed by said valves.

2. A hydraulic mount comprising a pair of mounting members, an elastomeric body connecting said members, an elastomeric diaphragm cooperating with said body to define a closed cavity filled with a liquid, a partition dividing said cavity into two chambers, an elongated orifice connecting said chambers, a flexible decoupler sealingly mounted along the periphery thereof in an opening through said partition, said decoupler having a central opening therethrough for connecting said chambers, a pair of valves on said partition sandwiching said decoupler and alternately contacted thereby to cover said decoupler opening on alternating deflection of said decoupler above a predetermined relative displacement of said mounting members, and at least one groove in both sides of said decoupler intersecting with said decoupler opening for providing limited communication between said chambers through said decoupler opening when same is otherwise alternately closed by said valves, said grooves forming a flow passage that is substantially smaller than said decoupler opening and proportionately decreases in size with increasing displacement by said decoupler squeezing against said valves to flatten said grooves.

3. A hydraulic mount comprising a pair of mounting members, an elastomeric body connecting said members, an elastomeric diaphragm cooperating with said body to define a closed cavity filled with a liquid, a partition dividing said cavity into two chambers, an elongated orifice connecting said chambers, an elastomeric decoupler sealingly mounted along the periphery thereof in an opening through said partition, said decoupler having a central opening therethrough for connecting said chambers, a pair of valves on said partition sandwiching said decoupler and alternately contacted thereby to cover said decoupler opening on alternating deflection of said decoupler above a first predetermined relative displacement of said mounting members, and a plurality of grooves in both sides of said decoupler intersecting with said decoupler opening and extending radially outward past said valves for providing limited communication between said chambers through said decoupler opening when same is otherwise alternately closed by said valves, said grooves forming a flow passage in each side that is substantially smaller than said decoupler opening and decreases in size with increasing displacement to zero at a second predetermined displacement higher than said first by said decoupler squeezing against said valves to flatten said grooves.

* * * * *